United States Patent
Rivlin et al.

(10) Patent No.: US 10,121,000 B1
(45) Date of Patent: Nov. 6, 2018

(54) SYSTEM AND METHOD TO DETECT PREMIUM ATTACKS ON ELECTRONIC NETWORKS AND ELECTRONIC DEVICES

(71) Applicant: FireEye, Inc., Milpitas, CA (US)

(72) Inventors: Alexandr Rivlin, Los Gatos, CA (US); Naveed Alam, Milpitas, CA (US); Vinoth Duraisamy, Fremont, CA (US)

(73) Assignee: FireEye, Inc., Milpitas, CA (US)

( * ) Notice: Subject to any disclaimer, the term of this patent is extended or adjusted under 35 U.S.C. 154(b) by 14 days.

(21) Appl. No.: 15/195,909

(22) Filed: Jun. 28, 2016

(51) Int. Cl.
*G06F 21/55* (2013.01)
*G06N 99/00* (2010.01)
*H04L 29/06* (2006.01)

(52) U.S. Cl.
CPC ......... *G06F 21/552* (2013.01); *G06N 99/005* (2013.01); *G06F 21/55* (2013.01); *G06F 2221/034* (2013.01); *H04L 29/06911* (2013.01); *H04L 29/06925* (2013.01); *H04L 29/06931* (2013.01); *H04L 29/06938* (2013.01)

(58) Field of Classification Search
CPC .. G06F 2221/034; G06F 21/552; G06F 21/55; G06N 99/005; H04L 29/06911; H04L 29/06931; H04L 29/06938
USPC .......................................................... 726/23
See application file for complete search history.

(56) References Cited

U.S. PATENT DOCUMENTS

| | | | | |
|---|---|---|---|---|
| 8,982,129 B1 * | 3/2015 | Broekhuijsen | .... | G06F 17/30961 345/440 |
| 9,275,069 B1 * | 3/2016 | Garrod | .............. | G06F 17/30227 |
| 9,584,541 B1 * | 2/2017 | Weinstein | ............. | H04L 63/145 |
| 9,857,958 B2 * | 1/2018 | Ma | ....................... | G06F 3/04847 |
| 9,857,960 B1 * | 1/2018 | Dennis | ................ | G06F 3/04847 |
| 2005/0165901 A1 * | 7/2005 | Bu | .......................... | H04L 45/38 709/217 |
| 2006/0070130 A1 * | 3/2006 | Costea | .................. | G06F 21/552 726/24 |
| 2006/0277321 A1 * | 12/2006 | Arsenault | ........... | H04L 63/1408 709/244 |
| 2010/0071054 A1 * | 3/2010 | Hart | .................... | H04L 63/1416 726/13 |
| 2010/0082513 A1 * | 4/2010 | Liu | ..................... | H04L 63/1458 706/46 |

(Continued)

*Primary Examiner* — Eleni A Shiferaw
*Assistant Examiner* — Shahriar Zarrineh
(74) *Attorney, Agent, or Firm* — Rutan & Tucker, LLP

(57) ABSTRACT

A computerized method for detecting premium attacks by an attack classification system is described. Based on received analytic information, the attack classification system generates logical representations for different portions of the analytic information represented as a nodal graph. The logical representations include objects, properties, and relationships between the objects and the properties. The attack classification system filters at least one relationship from the relationships and forms a first cluster further filtering the relationships. Being a logical representation of objects, properties and the remaining relationships, the first cluster is analyzed to determine features and introduce the features into the nodal graph. An analysis of the features determines whether the objects, properties and relationships forming the first cluster are associated with a premium attack by at least applying rule-based constraints to the features of the first cluster to determine whether they correspond to cluster features commonly present in premium attacks.

47 Claims, 12 Drawing Sheets

(56) References Cited

U.S. PATENT DOCUMENTS

| | | | | |
|---|---|---|---|---|
| 2011/0029523 | A1* | 2/2011 | Castillo | G06N 99/005 |
| | | | | 707/737 |
| 2012/0131672 | A1* | 5/2012 | O'Reirdan | H04L 63/1416 |
| | | | | 726/23 |
| 2014/0129936 | A1* | 5/2014 | Richards | G06F 21/6218 |
| | | | | 715/716 |
| 2015/0100543 | A1* | 4/2015 | Tsuchida | G06F 17/30592 |
| | | | | 707/603 |
| 2015/0172300 | A1* | 6/2015 | Cochenour | H04L 63/145 |
| | | | | 726/23 |
| 2015/0339477 | A1* | 11/2015 | Abrams | G06F 21/554 |
| | | | | 726/23 |
| 2016/0065601 | A1* | 3/2016 | Gong | G06F 21/561 |
| | | | | 726/23 |
| 2016/0381049 | A1* | 12/2016 | Lakhani | H04L 63/1416 |
| | | | | 726/23 |
| 2017/0187741 | A1* | 6/2017 | Desch | H04L 63/1433 |
| 2017/0244736 | A1* | 8/2017 | Benishti | H04L 63/1416 |
| 2017/0264627 | A1* | 9/2017 | Hunt | H04L 43/10 |
| 2017/0286677 | A1* | 10/2017 | Morkovsk | G06F 21/562 |
| 2017/0289187 | A1* | 10/2017 | Noel | H04L 63/1433 |
| 2018/0046801 | A1* | 2/2018 | Falk | G06F 21/56 |

\* cited by examiner

SYSTEM AND METHOD TO DETECT PREMIUM ATTACKS ON ELECTRONIC NETWORKS AND ELECTRONIC DEVICES

FIELD

Embodiments of the disclosure relate to the field of cybersecurity. More specifically, one embodiment of the disclosure relates to a system and method for detecting a premium attack from other commodity attacks, and thereafter, optionally providing an alert upon detection of the premium attack.

GENERAL BACKGROUND

Over the last decade, malicious software (malware) has become a pervasive problem for Internet users. In some situations, malware is a program or file that is embedded within downloadable content and designed to adversely influence or attack normal operations of a computer. Examples of different types of malware may include bots, computer viruses, worms, Trojan horses, spyware, adware, callbacks, or any other content that may operate within an electronic device (e.g., laptop computer, desktop computer, tablet computer, smartphone, server, router, wearable technology, or other types of electronics with data processing capabilities) without permission by the user or an administrator. The malware may be directed toward a specific target (premium attack) or may be released without a specific target (commodity attack). Hence, the targeting of the malicious attack is an important factor when evaluating the severity of an attack.

As described herein, "commodity" attacks are applied indiscriminately against victims and are deployed by the author (malware actor) without requiring his/her further intervention or guidance. In contrast, "premium" attacks are deployed against a specific target (or a set of targets) and exhibit signs of manual operator activity. These attacks may be specially crafted (custom-designed) for use against the target (or set of targets) for a planned purpose. The target (or set of targets) may be a particular electronic device (used by a particular individual) or may be a particular company or industry.

Successful premium attacks may lead to substantial losses such as high value data exfiltration or information technology (IT) infrastructure disruption, and are often launched by nation-states for strategic or military purposes against "high value" targets (e.g., defense contractor, utilities, governmental entity, officers of multi-national companies, etc.). Different types of premium (targeted) attacks may include (i) a zero-day attack that exploits a vulnerability (system or software weakness) before or on the day that the vulnerability is noticed, or (ii) an advanced persistent threat (APT) attack that includes concealed and continuous computer hacking processes, often orchestrated by humans targeting a specific entity. Due to their potential one time or limited use, premium attacks are difficult to detect and frequently escape detection through signature-based approaches. A reliable scheme for classifying premium attacks is needed.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

I. Overview

Figure 1:
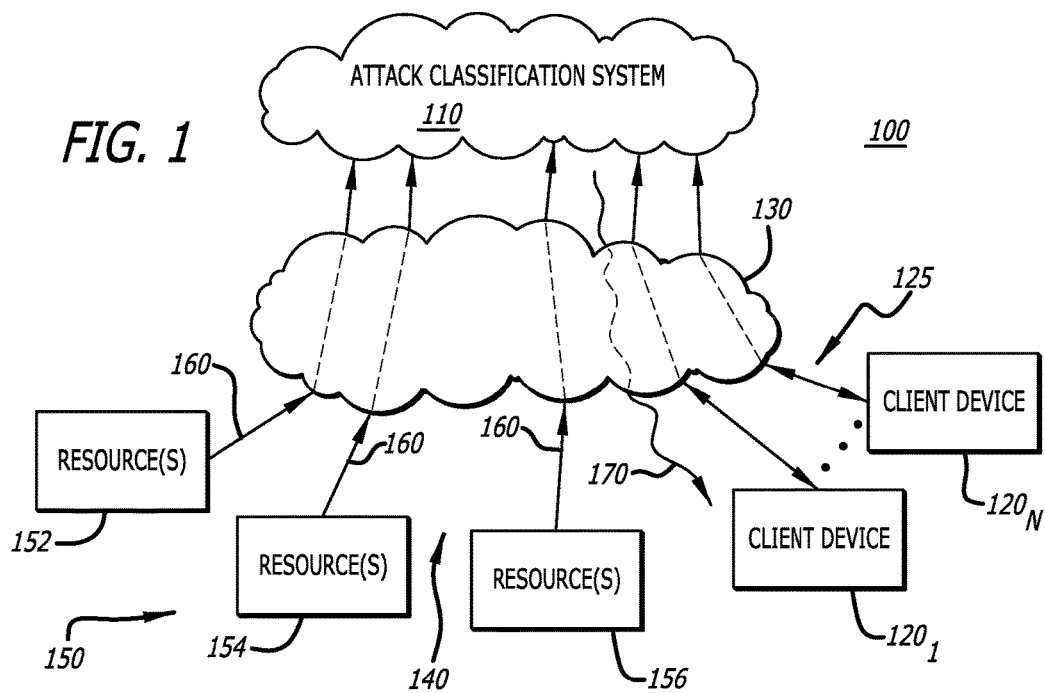
FIG. 1 is an exemplary block diagram of a networked security system that includes an attack classification system communicative coupled to one or more client devices over a network according to one embodiment of the invention.

One embodiment of the invention relates to a system and method for identifying premium attacks by differentiating these types of attacks from commodity attacks, and optionally, (i) providing one or more alerts in response to detecting that a premium attack is occurring or has recently occurred or (ii) providing a graphic user interface for detailed analysis by a network administrator of analytic information associated with the premium attack.

The identification of a premium attack from commodity attacks may be accomplished by an attack classification system that performs data modeling on incoming analytic information received from one or more resources. Herein, the attack classification system produces objects from the analytic information, logically relates these objects, and analyzes the relationships between these objects. Herein, an "object" is a portion of the analytic information that is structured in accordance with a selected data model and later analyzed by the attack classification system for clustering and subsequent determination as to whether a certain "cluster" of analytic information is associated with a premium attack. According to one embodiment of the disclosure, an object may include (i) a label, (ii) an object identifier, (iii) an object type, (iv) one or more properties that provide context for the object, and/or (v) an optional hash result of the content represented by the object.

As illustrative examples, an object may represent information (referred to as a "specimen") that has been previously analyzed and determined to be associated with a malicious attack. The "specimen" may include an executable (e.g., an application, program, routine, function, process, script, etc.) or non-executable content (e.g., a Portable Document Format "PDF" document, word processing document such as a Word® document, a short message service "SMS" text message, etc.). For instance, an object representing a PDF document (abc.pdf) may include (i) a label <abc>; (ii) identifier <assigned value unique for abc.pdf>; (iii) type <pdf>; (iv) properties (e.g., size=one megabyte, author=John Doe; date of creation=05/13/2016, etc.); and (v) hash result <hash of abc.pdf>. Of course, it is contemplated that other types of objects may be represented by different types of analytic information, where the analytic information is based on any stored content from prior cybersecurity analyses such as uniform resource locators "URLs", names of targeted organizations or individuals, residential country of the target organization or individual, Internet Protocol (IP) addresses, registry configuration settings, signature identifiers, or the like.

In general, a "property" may include either (i) information that pertains to a characteristic or behavior associated with content represented by the object or (ii) information that pertains to a characteristic of a relationship between objects. A characteristic includes context information that is determined from analysis of content represented by the object without execution or processing of that content. Some characteristics may include measured unit (e.g., time, weight, size, number, frequency, etc.) while other characteristics may be more robust (e.g., document type, vendor, web browser type, etc.). A behavior includes context information based on activities performed by the content (represented by the object) during processing. A few examples of different types of properties may include, but are not limited or restricted to the following: a label (name) of a file or process that was created by the specimen during malware analysis of the specimen within a malware detection appliance; attacker infrastructure (e.g., callback server name or IP address, intermediary router addresses, etc.); threat type learned through experiential knowledge and/or machine learning; registry paths that have been altered (changed, deleted); operating system (OS) type used by the specimen; frequency in accessing information associated with an object; object size in a selected measurement unit (e.g. bytes, characters, etc.); date of creation; time of detection; encrypted/clear-text state; Portable executable (PE) features of the executable files, or the like.

According to one embodiment of the disclosure, the attack classification system includes one or more hardware processors, local storage, and one or more input/output (I/O) interfaces. The I/O interface(s) may support wired communications (e.g., hardware ports, connectors, etc.) or wireless communications (e.g., antenna with a receiver or transceiver). Based on a pull or push data gathering scheme, the attack classification system is adapted to receive analytic information from different resources via the I/O interface(s).

Thereafter, in accordance with the selected data modeling scheme, the attack classification system generates a nodal graph from the analytic information, where the nodal graph is a logical representation of relationships between objects and properties formulated from the analytic information. For instance, for illustrative purposes, each object may be logically represented as a node in the nodal graph. Some of the properties may be represented as nodes while other properties may be represented as attributes associated with the nodes and/or relationships between the nodes. Also, each relationship may be logically represented as a link between two nodes.

Upon completion of the nodal graph, namely the logical representation of the analytic information and the relationships among this analytic information, the attack classification system conducts a filtering scheme to remove those relationships logically linking nodes that provide little or no assistance in the clustering of nodes (sometimes referred to as "incidental relationships"). More specifically, the filtering scheme may be configured to remove relationships that have a high degree of commonality among the nodes (i.e., noise in the nodal graph).

As an illustrative example, relationships associated with nodes that are based on calls to particular search engines (e.g., Google®, Yahoo®, etc.) may be removed. Other examples of incidental relationships removed during the filtering scheme may include certain time-based relationships that fall outside a desired time period for analysis as well as relationships that pertain to bad data, old data, or the like. Herein, according to one embodiment, the filtering scheme may be an iterative process, where relationships involving one node are evaluated, and thereafter, another node is selected and the relationships associated with that node are evaluated. This iterative process produces a more defined group of highly related objects that may share certain properties.

Thereafter, the attack classification system performs a clustering scheme that further evaluates the relationships and removes one or more relationships among the nodes to form clusters of nodes (sometimes also referred to as "communities") as described below. Hence, the clustering scheme may involve a further analysis of the "relatedness" of the relationships between the nodes, especially along edges of a concentrated grouping of nodes, and selective removal of incidental relationships associated with any of these edge nodes. The "relatedness" may be determined through connectivity analysis, where nodes involved in a prescribed number of relationships remain while others may be removed. One type of clustering scheme includes Girvan-Newman algorithm, but other data analysis and machine learning techniques may be used.

After the clusters are determined, each cluster may be analyzed to determine features associated with each of the clusters. The analysis may be conducted through targeted searches based on the properties associated with the nodes and relationships within the analyzed cluster. The determined features may include the number of object nodes within the cluster, the number nodes that are associated with a particular type of executable (e.g., Javascript®, OS type, browser type, etc.) or non-executable (e.g., PDF, Word® document, particular file type, etc.), the number of nodes associated with a particular industry, particular country or countries represented by the cluster, number of distinct end points affected by the attack and temporal properties of lateral movement of malware, node connectivity (e.g., which node supports the most (or fewest) relationships, number of relationship between the object nodes, longest path, shortest path, etc.), and/or temporal properties (e.g., time, reference to an occurrence of an event, etc.).

Thereafter, according to one embodiment of the disclosure, some or all of the determined features associated with a cluster may be introduced into the nodal graph associated with the cluster. Thereafter, an analysis is conducted to classify whether a particular cluster is associated with a premium attack. The classification of a cluster as being associated with a premium attack may depend, at least in part, on the cluster size, presence of indicators pointing to manual activities by the attacker in execution of the attack, indicators helping to classify complexity and customization of malware used, indicators pointing to size of the team on the attack, or other cluster features that are commonly present in premium attacks based on previous analyses.

II. Terminology

In the following description, certain terminology is used to describe aspects of the invention. For example, in certain situations, the term "logic" represents hardware, firmware and/or software that is configured to perform one or more functions. As hardware, logic may include circuitry having data processing functionality. Examples of data processing circuitry may include, but is not limited or restricted to, a processor that generally corresponds to any special purpose processor such as an application-specific integrated circuit (ASIC), a general purpose microprocessor, a field-programmable gate array (FPGA), one or more processor cores, or microcontroller; a wireless receiver, transmitter and/or transceiver circuitry.

The logic may be in the form of one or more software modules, such as executable code in the form of an executable application, an application programming interface (API), a subroutine, a function, a procedure, an applet, a servlet, a routine, script, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "analytic information" generally refers to information gathered during an analysis of at least one malicious attack as well as additional information that may provide contextual information concerning that detected malicious attack(s). For instance, analytic information may include results from malware analyses of one or more specimens by a malware detection appliance; information from customer logs; and/or information from databases or directories that store organization/employee information. Additionally, the analytic information may further include analytic results derived from machine learning and analysis of malware samples, signature databases, forensic analyses, and/or third-party sources.

The analytic information may be provided to the attack classification system in accordance with a prescribed messaging scheme such as one or more data streams each including a series of packets, frames, an Asynchronous Transfer Mode "ATM" cells, or any other series of bits having a prescribed format.

The term "malware" is directed to information that produces an undesired behavior upon activation, where the behavior is deemed to be "undesired" based on customer-specific rules, manufacturer-based rules, any other type of rules formulated by public opinion or a particular governmental or commercial entity, or an indication of a potential exploit in a particular software profile. This undesired behavior may include a communication-based anomaly or an execution-based anomaly that (1) alters the functionality of an electronic device executing application software in a malicious manner; (2) alters the functionality of an electronic device executing that application software without any malicious intent; and/or (3) provides an unwanted functionality which may be generally acceptable in other context.

The term "transmission medium" refers to a communication path between two or more systems (e.g. any electronic devices with data processing functionality such as, for example, a security appliance, server, mainframe, computer, netbook, tablet, smart phone, router, switch, bridge or router). The communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

In general, a "malware detection appliance" generally refers to a security device that analyzes behavior of specimens being processed within one or more virtual machines or emulated computer functionality. Operating within the malware detection appliance, a "virtual machine" (VM) simulates operations of an electronic device (abstract or real) that is usually different from the electronic device conducting the simulation. A VM may be used to provide a sandbox or safe runtime environment that enables detection of malicious attacks.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

III. General Architecture

As this invention is susceptible to embodiments of many different forms, it is intended that the present disclosure is to be considered as an example of the principles of the invention and not intended to limit the invention to the specific embodiments shown and described.

Referring to FIG. 1, an exemplary block diagram of an illustrative embodiment of a networked security system 100 is shown. Herein, the security system 100 includes an attack classification system 110 that is communicatively coupled to one or more client devices $120_1$-$120_N$ (N≥1) via transmission medium 130 forming a network 140. The client device(s) $120_1$-$120_N$ correspond to one or more customers. The attack classification system 110 is further communicatively coupled to one or more resources 150 (hereinafter "resource(s)") to receive analytic information 160 from the resource(s) 150. The analytic information 160 corresponds to information gathered during an analysis of a malicious attack as well as additional information that provides contextual information concerning that detected malicious attack, where such information may assist in determining a prescribed likelihood of manual presence for this attack that qualifies the detected malicious attack as a premium attack.

The resource(s) 150 may include a customer-based source 152 that provides information associated with the customer that may assist in determining a type of malicious attack. As an illustrative example, a customer-based source may include (a) one or more malware detection appliances installed at a customer site that have acquired information associated with one or more malicious attacks, (b) customer logs (e.g., firewall logs, Dynamic Host Configuration Protocol "DHCP" logs, Lightweight Directory Access Protocol "LDAP" logs, etc.), and/or (c) databases or directories that store organization information other than personal identification information associated with employees, financials, passwords, or the like. The resource(s) 150 may further include (i) one or more research-based sources 154, including electronic devices or other types of logic that provide information derived from machine learning and analysis of malware samples, signature databases, or forensic analysis; and/or (ii) third-party sources 156 conducting independent studies of malicious attacks on a global, regional or industry scale.

As shown in FIG. 1, the resource(s) 150 are communicatively coupled to the attack classification system 110 via the network 140 operating as a public network and geographically separate from an enterprise network 125 that supports client device(s) $120_1$-$120_N$. In another embodiment, however, the attack classification system 110 may be implemented behind a firewall and communicatively coupled so as to be part of the enterprise network 125 supporting the client device(s) $120_1$-$120_N$. For example, the attack classification system 110 may conduct the premium attack classification entirely or at least primarily within the enterprise network 125 when deployed for a large, multinational corporation or a national government.

In response to receiving the analytic information 160, the attack classification system 110 automatically determines whether certain portions of the received analytic information 160 are associated with a premium attack, and if so, the attack classification system 110 may be configured to automatically transmit an alert 170 to one or more of the client devices $120_1$-$120_N$. The alert 170 may include an electronic message (e.g., text, email, desktop popup message, etc.) that identifies the target (e.g., particular electronic device, company, or industry) of the determined premium attack along with information concerning the premium attack (e.g. source, time of upload into the device, entry point within the network, etc.). The alert 170 may be directed to at least client device $120_1$ accessed by an network administrator associated with an enterprise 125 targeted by the premium attack. Additionally, or in the alternative, the alert 170 may be directed to a device of a network administrator or another representative associated with another enterprise, such as an enterprise within the same industry or within the same geographic location as the targeted enterprise 125.

Besides identifying a premium attack and transmitting an alert, the attack classification system 110 may conduct further operations. For instance, the attack classification system 110 may be configured to create attacker profiles based on a cluster of analytic information associated with the premium attack. Additionally, or in the alternative, the attack classification system 110 may be configured to preserve analytic information for a cluster that is determined to be associated with a premium attack and/or generate displayable images to highlight particular analytic information for any cluster or combination of clusters in order to provide visibility of aspects of the premium attack for subsequent customer-based analysis.

Referring still to FIG. 1, each client device(s) $120_1$-$120_N$ may be any type of electronic device, including a laptop computer, desktop computer, tablet computer, smartphone, server, network device (e.g., firewalls and routers), wearable technology, or other types of electronics with data processing capabilities and network connectivity. Furthermore, each of the client device(s) $120_1$-$120_N$ may include one or more processors with corresponding memory for processing data along with one or more network interfaces that support communications with the attack classification system 110 as well as other devices over the network 140. The network interfaces may communicate with one or more devices using wireless and/or wired protocols, including the IEEE 802.3 and the IEEE 802.11 suite of standards. In one embodiment, the network interfaces of the client device(s) $120_1$-$120_N$ allow for receipt of alerts 170 over the network 140 from the attack classification system 110, as described above.

Figure 2:
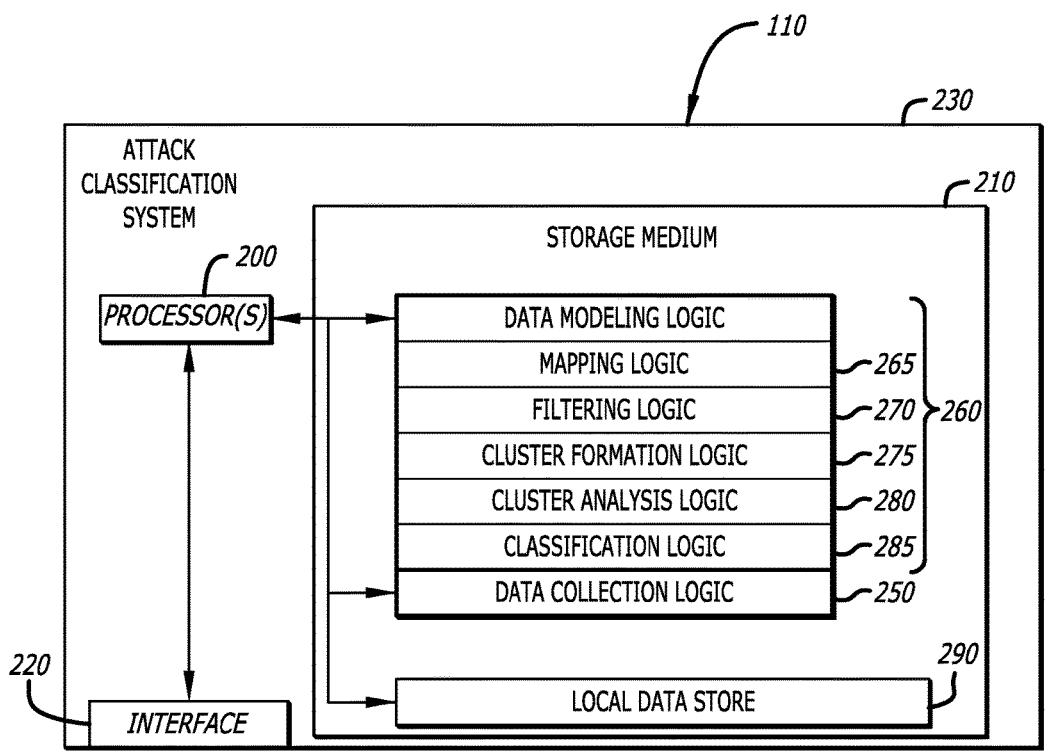
FIG. 2 is an exemplary block diagram of an illustrative embodiment of the attack classification system of FIG. 1.

Referring now to FIG. 2, an embodiment of the attack classification system 110 may include one or more hardware processors 200, a storage medium 210, and one or more input/output (I/O) interfaces 220, which are at least partially enclosed within a housing 230. The housing 230 may be made entirely or partially of a rigid material (e.g., hard plastic, metal, glass, composites, or any combination thereof) that protects these components, namely the processor(s) 200, storage medium 210 and I/O interface(s) 220, from environmental conditions.

According to one embodiment of the disclosure, the storage medium 210 includes one or more components that provide either temporary storage (e.g., volatile memory such as read access memory "RAM") or persistent storage (e.g., battery-backed random, flash, optical drive, etc.), or a plurality of components that provide both temporary storage and persistent storage. Herein, the storage medium 210 is configured to store data collection logic 250, data modeling logic 260 and a local data store 290. The local data store 290 may provide the temporary and/or persistent storage for received analytic information 160 as well as information generated by both the data collection logic 250 and the data modeling logic 260 during processing by the processor 200.

According to one embodiment of the disclosure, the data collection logic 250 may be executed by the processor(s) 200 and fetches the analytic information 160 in response to a triggering event. Alternatively, the data collection logic 250 may execute in the background as a daemon application, and upon detecting the triggering event, automatically transitions to a foreground executing application. Examples of a triggering event may include, but are not limited or restricted to a temporal based event (e.g., a prescribed time period has elapsed since the last premium attack analysis, programmable analysis time has begun, etc.), or a detected activity (e.g., detection of a malicious attack by a malware detection appliance that monitors network traffic over a particular enterprise network that is communicatively coupled to the attack classification system 110).

In response to the triggering event, the data collection logic 250 obtains the analytic information 160 from the resource(s) 150. Herein, the analytic information 160 includes information from any number of resources 150, including analytic information from customers, from forensic analysis units, or from third parties. As a result, the analytic information 160 may include information gathered during one or more detected malicious attacks (e.g., malicious specimens, detected characteristics of these specimens, detected malicious behaviors of the specimens, detection time, threat level assigned, delivery method, created (dropped) files or processes, country, industry, etc.). However, the analytic information 160 may include other types of information from customer resources such as firewall log data, DHCP log data, LDAP log data, and/or information pertaining to a certain organization involved with the detected attacks as well as targeted employees of such organizations.

Besides customer-centric information, other information based on one or more concentrated analyses of the results from the one or more detected malicious attacks may be provided to the attack classification system 100 such as attacker infrastructure (e.g., callback server name or IP address, intermediary router addresses, etc.) or available (or matched) malware signatures. Such information may be gathered from one or more forensic analysis units, gathered through experiential knowledge and/or machine learning, gathered from a malware signature database, and/or gathered from third party for example.

As further shown in FIG. 2, the data modeling logic 260 includes mapping logic 265, filtering logic 270, cluster formation logic 275, cluster analysis logic 280, and classification logic 285. Operating subsequent to or concurrently (i.e. overlapping at least in part in time) with the data collection logic 250, the mapping logic 265 structures portions of the analytic information 160 in accordance with graph data modeling being performed by the data modeling logic 260. Hence, the mapping logic 265 is configured to produce a logical representation that includes objects, some types of properties, and relationships associated with these objects and/or properties. The objects/properties selected by the mapping logic 265 are directed to those objects/properties that, according to a selected data model, provide information that may assist in determining whether a premium attack is being conducted.

Figure 5A:
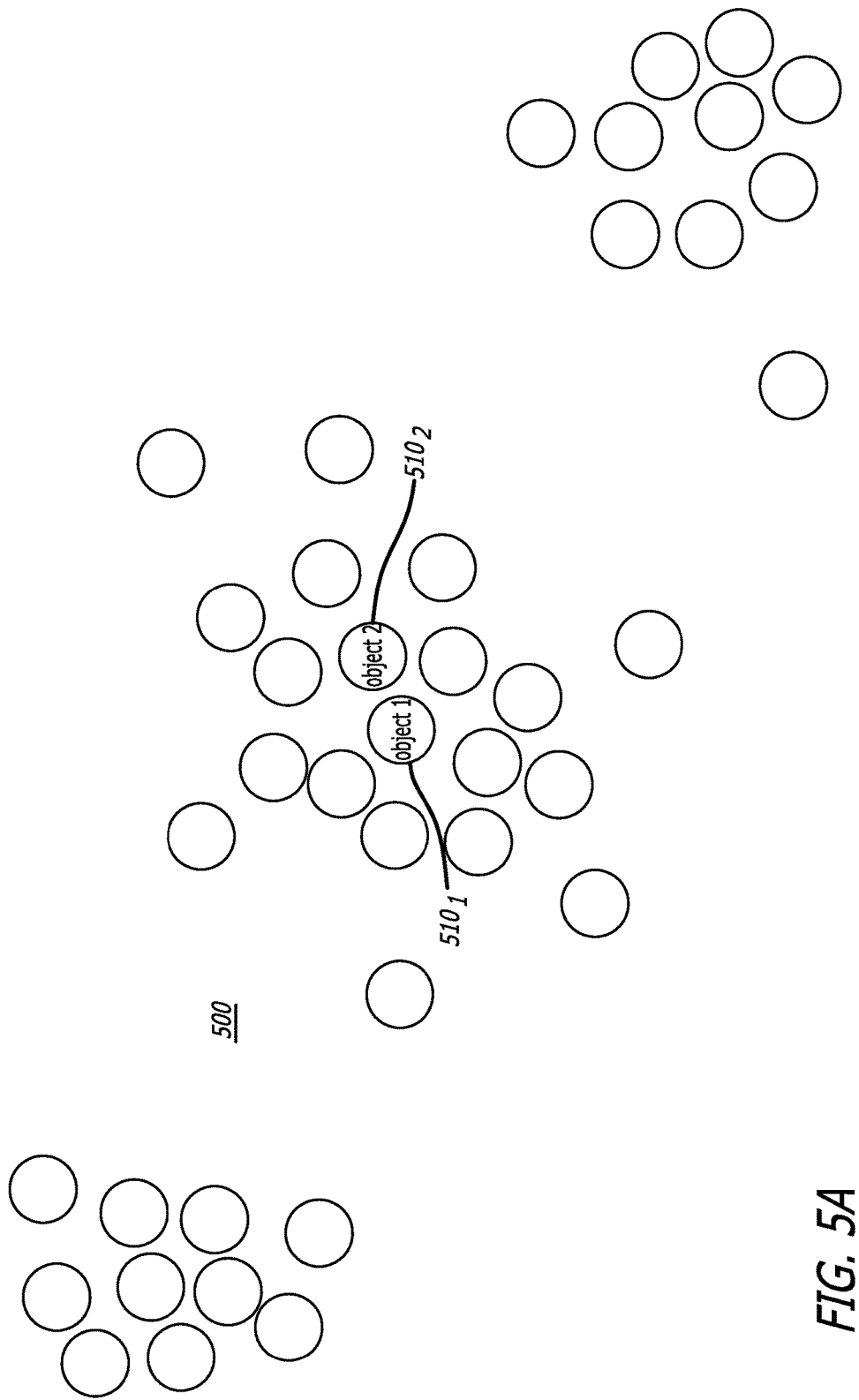
FIGS. 5A-5C illustrate the data collection phase of portions of received analytic information being conducted by the attack classification system operating in accordance with a selected graph data model.

More specifically, in accordance with the selected graph data model, the mapping logic 265 produces an object that includes a particular portion of the analytic information 160 received from the resource(s) 150, which may be logically represented as a node $510_i$ within a nodal graph 500 as shown in FIG. 5A. For instance, as an illustrative embodiment, a first node $510_1$ (i=1) represents an object associated with a label of a document analyzed by the malware detection appliance. A second node $510_2$ (i=2) represents an object associated with a URL embedded within the document represented as the first node $510_1$. Hundreds, thousands or hundreds of thousands of objects may be formulated from the analytic information 160 and these objects are represented as nodes $510_1$-$510_X$ (X>>1).

Figure 5B:
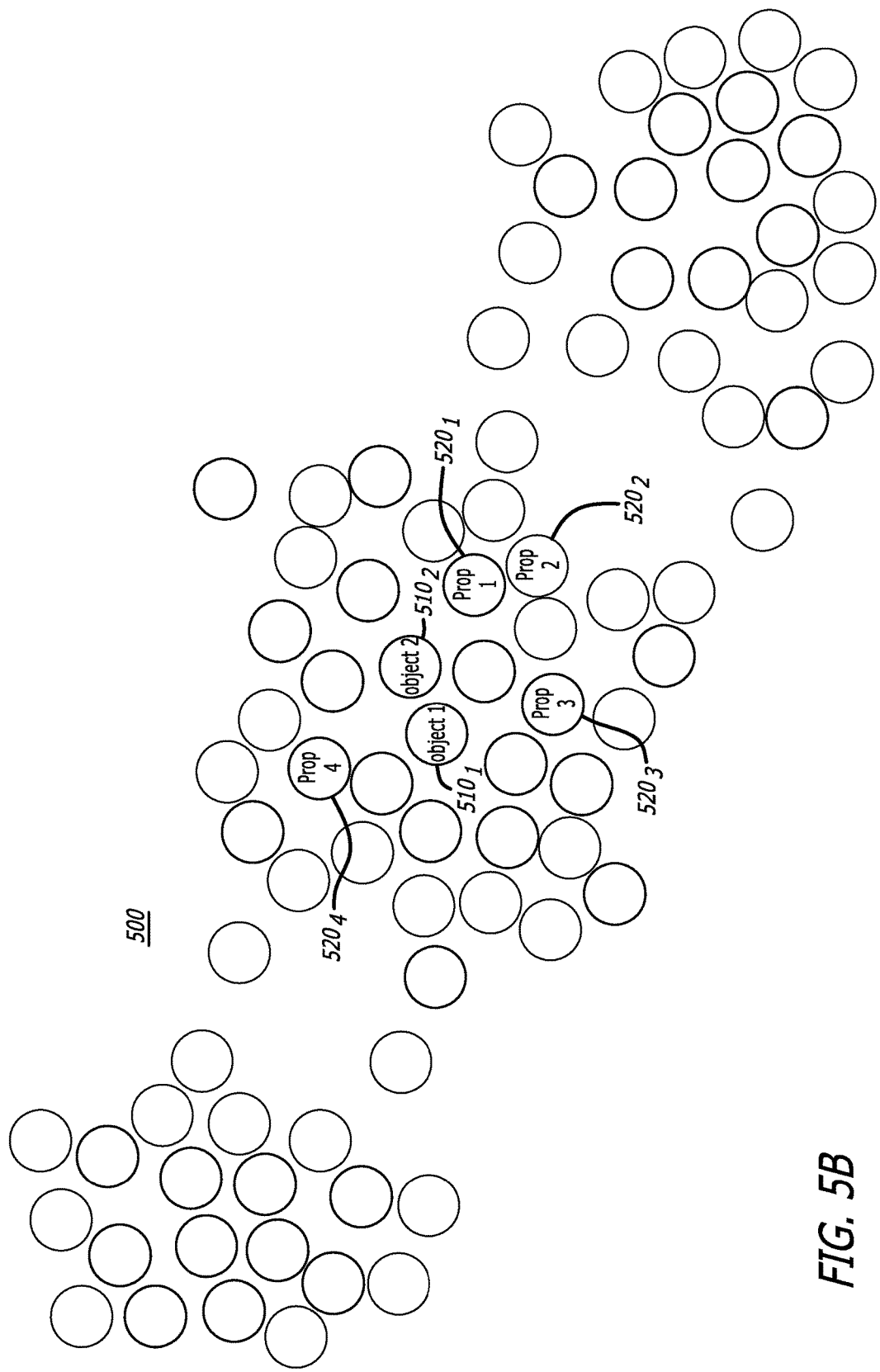
Figure 5C:
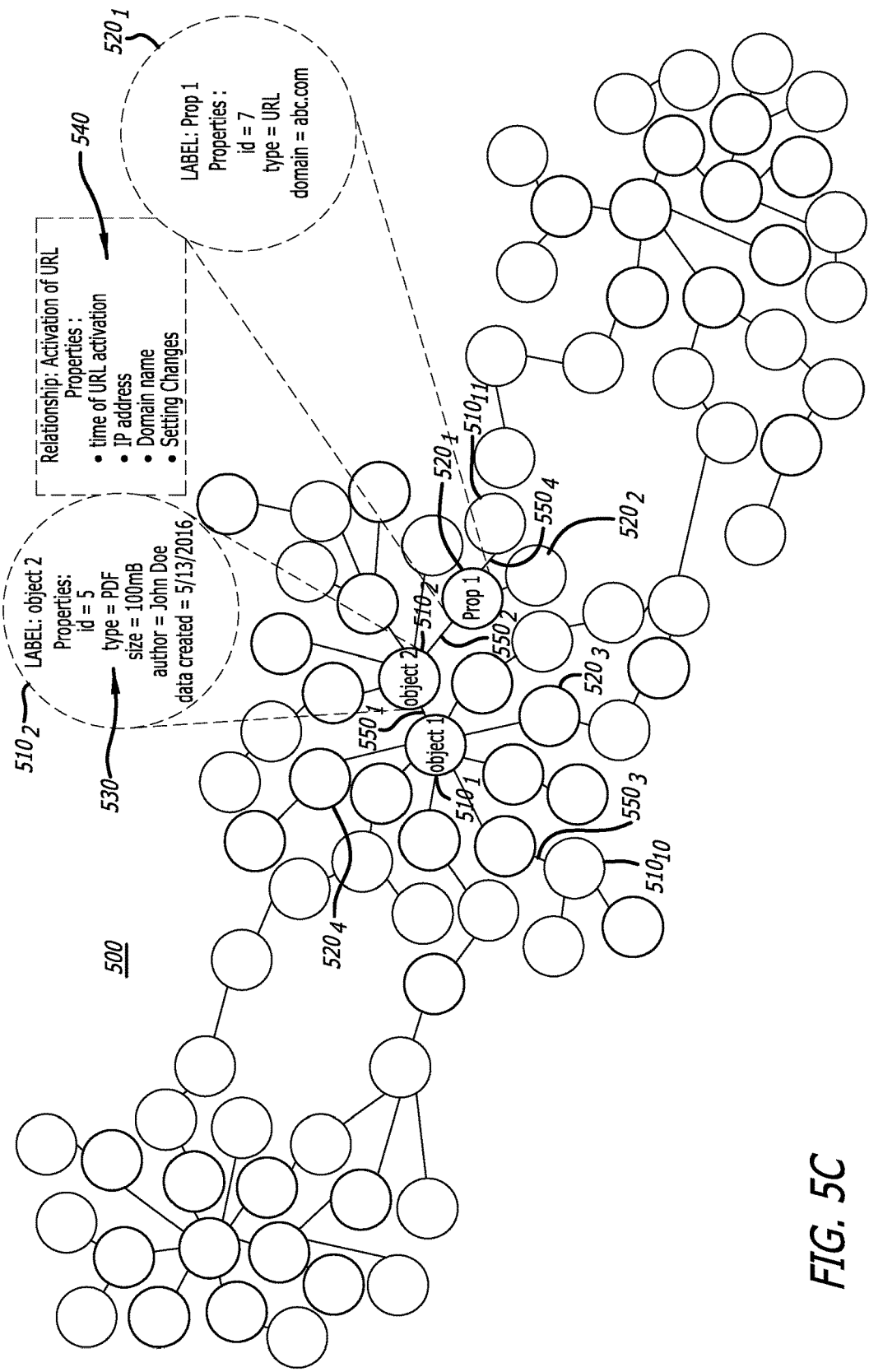

Additionally, as shown in FIG. 2 and FIG. 5B, the mapping logic 265 extracts properties from the analytic information 160, where some of all of these properties may be logically represented as nodes $520_j$ within the nodal graph 500 while other properties may be represented as attributes 530 associated with an (object) node $510_i$ or a relationship $550_k$ (k≥1) as shown in FIG. 5C. For instance, as an illustrative embodiment, a third node $520_1$ may correspond to detected property—a name of a process that commenced upon activation of the URL represented as the second (object) node $510_2$. Similarly, node $520_2$-$520_4$ may correspond to analytic information associated with (i) the name of a registry changed by the process represented by third node $520_1$, (ii) organization experiencing the malicious attack, and/or (iii) threat level measured concerning the document represented by the first node $510_1$, respectively. Hundreds, thousands or hundreds of thousands of nodes ($520_1$-$520_Y$, Y>>1) may be formulated from properties associated with the analytic information 160.

As further shown in FIG. 5C, the mapping logic 265 determines the logical relationships between the nodes $510_1$-$510_X$ and/or $520_1$-$520_Y$. For instance, the mapping logic 265 determines a relationship between the first node $510_1$ and the second node $510_2$, which is represented by a first logical (representation) link $550_1$. Although not shown, the properties 560 associated with the relationship $550_1$ may include the domain name, Internet Protocol version, country, metadata identifying when the URL was embedded into the document, etc. As another illustrative example, the mapping logic 265 determines a relationship between the second node $510_2$ and the third node $520_1$, which is represented by a second logical (relationship) link $550_2$. As previously described, the attributes 540 associated with the relationship $550_2$ may include the time of URL activation, domain name (or IP address) associated with the URL, configuration setting changes, when changes occurred, what executable initiated the configuration setting, etc.

Figure 6A:
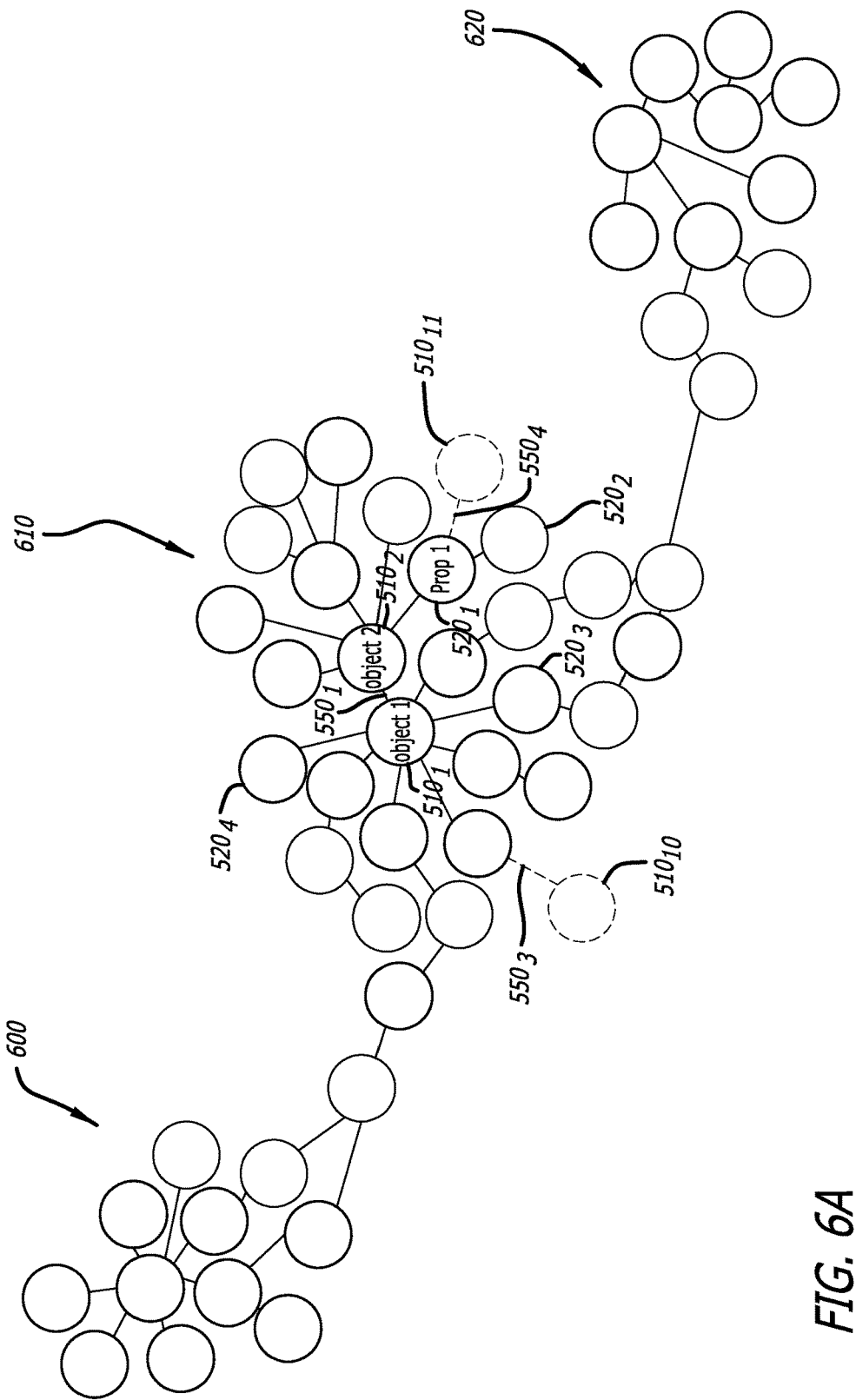
FIGS. 6A-6D illustrate the cluster formation and analysis phase of portions of the received analytic information being conducted by the attack classification system operating in accordance with the graph data model of FIGS. 5A-5C.

Referring back to FIG. 2, the filtering logic 270 is configured to perform a filtering scheme to remove those relationships logically linking nodes $510_1$-$510_x$ and/or $520_1$-$520_y$, that provide little to no assistance in the clustering of nodes (sometimes referred to as "incidental relationships"). More specifically, the filtering scheme is configured to remove relationships that have a high degree of commonality among the nodes (i.e., constitute noise in the nodal graph). As an example, relationships $530_3$-$530_4$ associated with nodes $510_{10}$-$510_{11}$ that are based on calls to particular search engines (e.g., Google®, Yahoo®, etc.) may be removed as shown in FIG. 6A. Other examples of incidental relationships removed by the filtering scheme may include domain name server (DNS) lookups, certain time-based relationships that fall outside a desired time period for analysis as well as relationships that pertain to data already known due to past iterations of analysis, test data, bad data, old data, HTTP requests to known benign domains or IP addresses, or the like. Herein, the filtering scheme is an iterative process, where relationships involving one node are evaluated, and thereafter, another node is selected and the relationships associated with that node are evaluated. This iterative process produces more defined groupings of highly related object nodes that may share certain properties.

Referring still to FIG. 2, attack classification system 110 further comprises cluster formation logic 275 that is configured to perform a clustering scheme that further evaluates the relationships and removes one or more relationships among the nodes to form clusters of nodes (sometimes also referred to as "communities"). The clustering scheme conducts an analysis of the "relatedness" of the relationships between the nodes, especially along edges of a concentrated grouping of nodes (hereinafter "edge nodes"). According to one embodiment of the disclosure, this "relatedness" may be determined through connectivity analysis, where nodes with a prescribed number of logical relationships are maintained as part of the nodal graph 500 while nodes with less than the prescribed number of logical relationships may be removed (see FIG. 6B). One type of clustering scheme includes Girvan-Newman algorithm, but other data analysis and machine learning techniques may be used. Hence, the cluster formation logic 275 establishes more defined clusters for subsequent analysis.

Figure 6B:
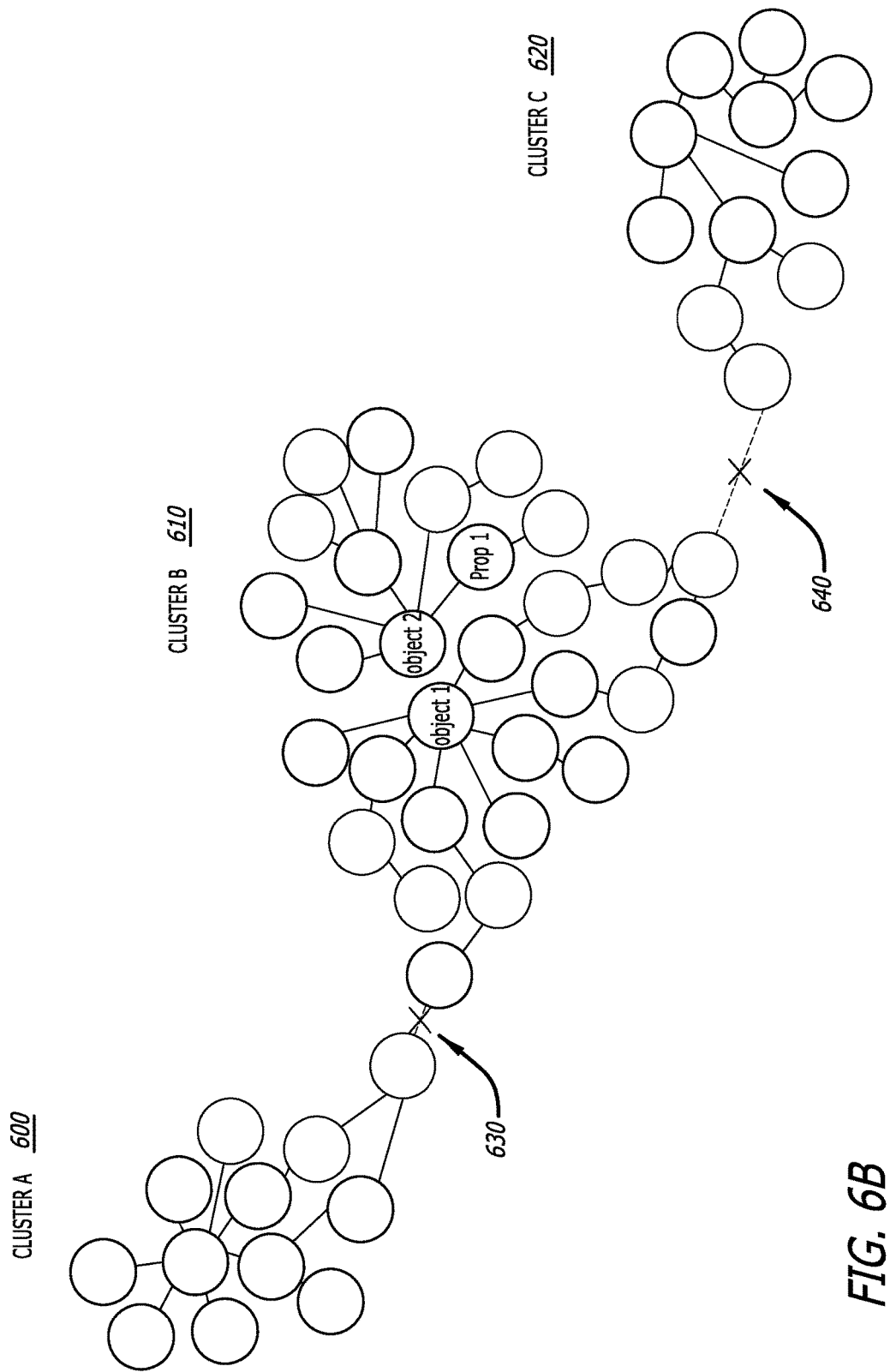
Figure 6C:
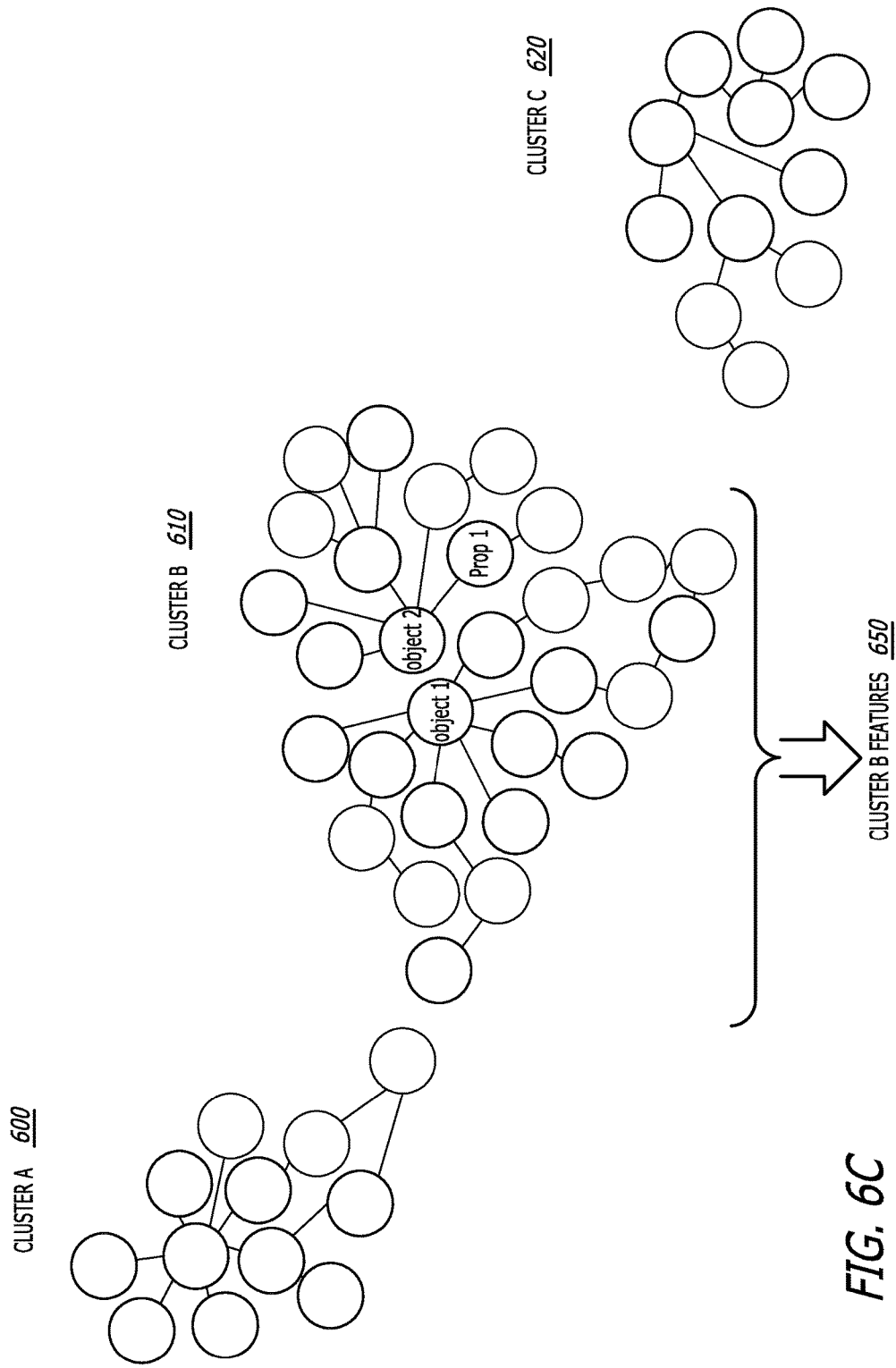

Referring still to FIG. 2, after operations by the cluster formation logic 275, the cluster analysis logic 280 analyzes selected clusters to determine features associated with each of the clusters as illustrated in FIG. 6C. The analysis may be conducted through one or more targeted searches based on the properties (attributes) associated with the nodes and relationships within the analyzed cluster. As a result, the cluster analysis logic 280 amasses a plurality of features associated with the cluster. Examples of these features may include, but are not limited or restricted to the following: (1) the number of object nodes within the cluster; (2) the number of nodes that are associated with a particular type of executable (e.g., Javascript®, OS type, browser type, etc.); (3) the number of nodes that are associated with a particular type of non-executable (e.g., PDF, Word® document, particular file type, etc.); (4) lateral proliferation of potential malware that may be represented by the number or rate of increase of newly added client devices pertaining to the cluster, time of day of proliferation (e.g., with due consideration of time zones to yield indicators of country/region specific attacks); (5) number of original sources (hosts) for the analytic information; (6) the number of nodes associated with a particular industry; (7) the number of countries represented by the cluster as well as which countries are represented by the cluster; (8) node connectivity (e.g., which node supports the most (or fewest) relationships, number of relationship between the object nodes, longest path, shortest path, etc.); and/or (9) temporal properties (e.g., time, reference to an occurrence of an event, etc.).

Figure 6D:
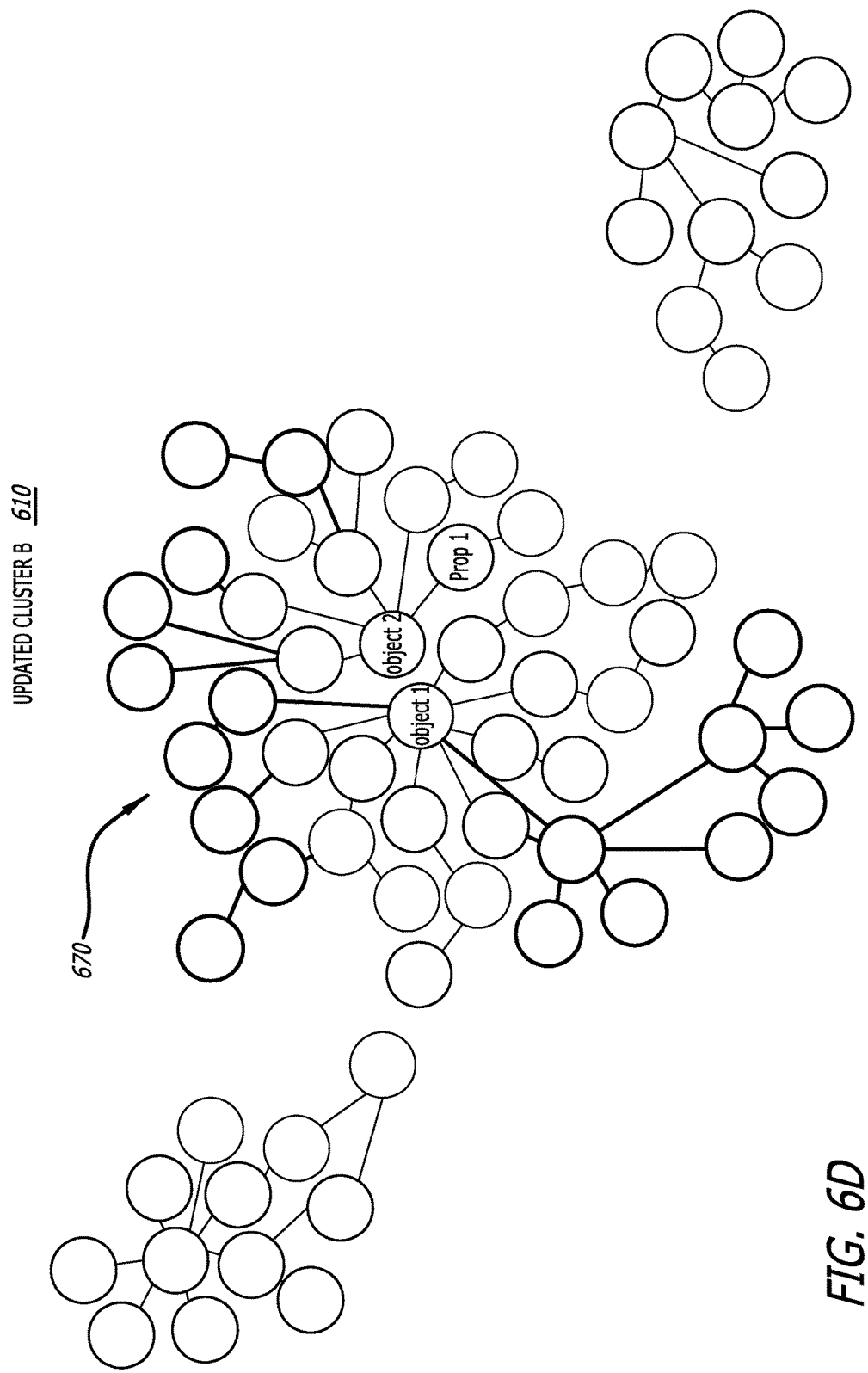

Additionally, the cluster analysis logic 280 may operate in combination with the mapping logic 265 to introduce the cluster features with the analytic information, which may be logically represented as inserting new nodes into the nodal graph 500 associated with the cluster 610 under analysis as shown in FIG. 6D. Additionally, or in the alternative, it is contemplated the some or all of the determined features may be added as properties of the current nodes and/or relationships forming the cluster, as there are many other ways to apply the newly evaluated features of the cluster for further analysis. For instance, one example may include creation of a new nodal graph consisting of one or more clusters identified in the previous analysis.

The classification logic 285 is configured to classify whether a particular cluster is associated with a premium attack based, at least in part, on the cluster features determined by the cluster analysis logic 280. According to one embodiment of the disclosure, the classification logic 285 may be configured to apply rule-based constraints to different cluster features to identify premium attacks. This multi-dimensional constraint is dynamic, and thus, each rule-based constraint may be adjusted depending on machine learning and other intelligence associated with current tendencies being utilized when conducting a malicious attack.

Moreover, a number of factors may influence what constraints are evaluated to determine a potential presence of a premium attack as well as the parameters associated with these constraints. One factor may be the number of clusters formed, where one analysis technique may increase the number of constraints to provide sufficient differentiation between clusters to improve accuracy in premium attack detection while another analysis technique may decrease the number of constraints to maintain the total analysis time within a prescribed duration. Another factor may be dependent on the type of clustering scheme selected as different cluster features may be analyzed. As a result, the constraints for classification of clusters organized in accordance with one clustering scheme may differ from constraints selected for the classification of clusters organized in accordance with another clustering scheme.

Also, as the durations of the analyses increase, the parameters associated with these constraints may be adjusted to address estimated proportional changes in the cluster. For example, one of the rule-based constraints considered by the classification logic 285 in determining the presence of a premium attack may include cluster size. For data modeling for a first prescribed time period, a cluster size potentially considered to be part of a premium attack may range from a first value to a second value, such as 1-to-10 nodes as a numeric example. However, for data modeling for a second prescribed time period, for which the first prescribed time period is only part of the second prescribed time period, the cluster size of interest may range from the first value to a third value that is greater than the second value, such as 1-to-15 nodes. The cluster size may operate as a parameter for analyzing the distribution of the clusters to uncover a set of clusters that fall below the average node count and may suggest a higher likelihood of an attack being a premium attack.

When certain cluster features are determined to comply with selected rule-based constraints, the malicious attack is determined to be a premium attack. Some of these cluster features considered by the classification logic 285 may include cluster size, as clusters with a high number of nodes tend to be commodity attacks, the type of malware, application/software that the malware affects, number of infected users/companies/industries, or the like. Hence, with number of nodes associated with the cluster that fall within a prescribed range may be a factor in determining whether a malicious attack is a premium attack. Other constraints may be directed to the average number of new client devices detected per a selected time frame (e.g., hour, day, week, etc.) that are infected with malware or a particular type of malware, or the number of original sources (hosts) falling with a prescribed range that infers a concentrated attack.

Of course, the classification logic 285 may consider additional cluster features as part of the multi-dimensional constraints that are evaluated in classifying a malicious attack as a commodity attack or a premium attack. For example, none, some or all of the following cluster features may be used as constraints that are considered by the classification logic 285 in determining a potential premium attack has been conducted or is currently being conducted: the presence of indicators pointing to manual activities by the attacker in execution of the attack such as information that illustrates lateral movement (e.g., increased device infections, new (and multiple) malicious source IP addresses, variances of malware); indicators helping to classify complexity and customization of malware used (e.g., malware family membership, etc.); indicators pointing to size of team on the attack (e.g., number of emails from different users having the same IP domain), or other cluster features that are commonly present in premium attacks based on previous analyses.

Figure 3:
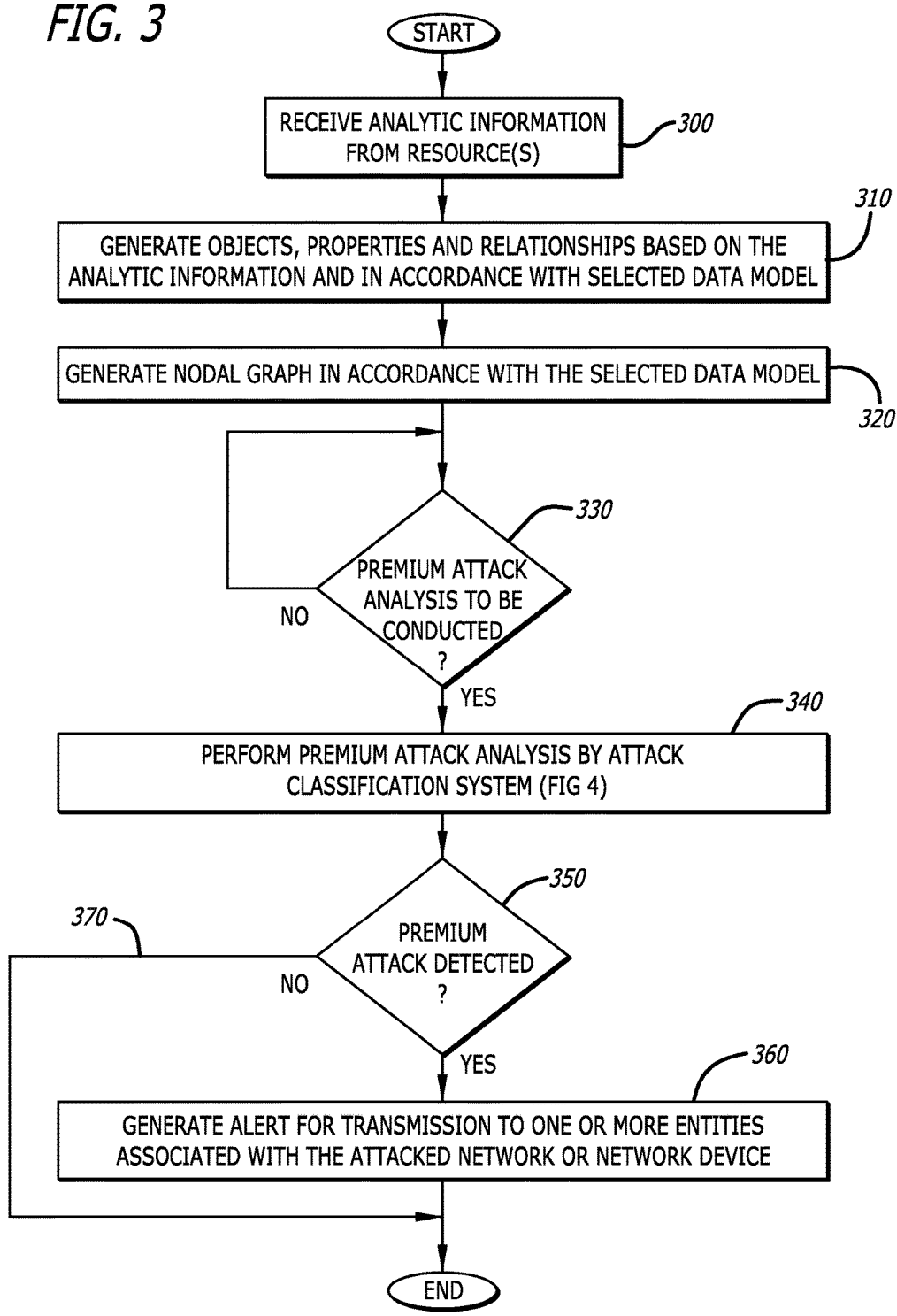
FIG. 3 is an exemplary flowchart of the general operability of the attack classification system of FIG. 1.

Referring now to FIG. 3, an exemplary flowchart of the operability of the attack classification system of FIG. 1 is shown. Herein, analytic information from the resources is received (block 300). For instance, a portion of the analytic information may include results of one or more analyses of specimens by a malware detection appliance with VM functionality as described in U.S. patent application Ser. No. 14/952,808, the entire contents of which are incorporated by reference. Other portions of the analytic information may include information from customer logs, databases or directories maintained by customers for services provided by the attack classification system as well as analytic results derived from machine learning and analysis of malware samples, signature databases, forensic analyses, and/or malware-related analytics from third-party sources. From the received analytic information, the data collection logic of the attack classification system forms data structures associated with objects and properties as well as the relationships between two objects, between two properties, or between an object and property (block 310).

Thereafter, the mapping logic of the attack classification system generates a nodal graph that features the formulated objects, properties and relationships (block 320) as shown in FIGS. 5A-5C. As a result, the attack classification system has been provided with analytic information, which may include analysis results associated with malicious specimens as well as contextual information that may assist in determining whether one of the malicious specimens is part of a premium attack.

Thereafter, as shown in FIG. 3, the attack classification system conducts a premium attack analysis to determine whether the analytic information conveys that a premium attack has been conducted and/or is currently in process (blocks 330 and 340). If a premium attack is detected, the attack classification system generates and transmits an alert to one or more electronic devices associated with the enterprise under attack (block 350 and 360). Otherwise, the process ends and may re-commence at a later time (block 370).

Figure 4:
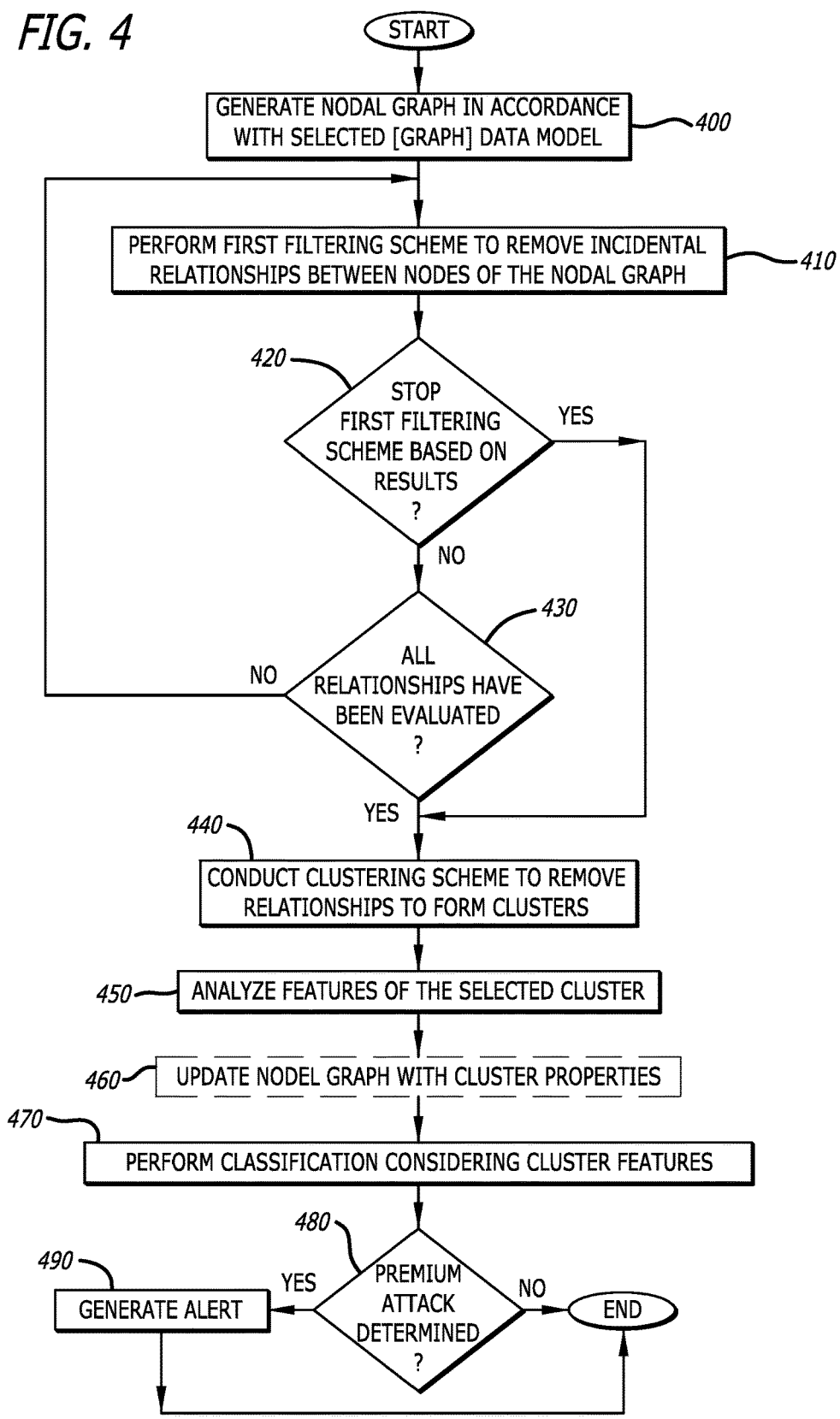
FIG. 4 is detailed exemplary flowchart of a premium attack analysis scheme identified in FIG. 3 that is conducted by the attack classification system.

Referring to FIG. 4, detailed exemplary flowchart of the premium attack analysis identified in FIG. 3 that is conducted by the attack classification system is shown. Upon receipt of the analytic information, the relationships between portions of the analytic information are established, which may be represented through a nodal graph (block 400). Stated differently, as a logical representation, the nodal graph is generated in accordance with a selected graph data model, where nodal graph logically represents the relationships between these nodes, where each node represents an object or a property.

As shown in FIG. 5A, the objects from the analytic information are determined, which is represented by placement of nodes $510_1$-$510_X$ (X>>1) on the nodal graph 500. Thereafter, as shown in FIG. 5B, the properties from the analytic information are determined, where some of all of these properties may be represented as nodes $520_1$-$520_Y$ (Y>>1) while other properties may be represented as attributes 530 associated with the (object) nodes and the relationships 550 that are represented as links between related nodes as shown in FIG. 5C.

Referring back to FIG. 4, after formation of the nodal graph 500, a filtering scheme is performed to remove incidental relationships logically linking nodes, where these incidental relationships provide little to no assistance in the clustering of nodes $510_1$-$510_X$ (block 410). For instance, as shown in FIG. 6A, the filtering scheme is configured to remove relationships (e.g., relationships $550_3$ and $550_4$) that have a high degree of commonality among the nodes, and thus, constitute noise in the nodal graph. For instance, common types of HTTP Get requests may be removed or "old" analytic information (i.e. detected and store more than a prescribed time period from the current time as provided by a real-time clock). The filtering scheme produces formations 600, 610 and 620 that are appearing to denote clusters.

Referring back to FIG. 4, the filtering scheme may be conducted as an iterative process, where relationships involving one node are evaluated, and thereafter, another node is selected and the relationships associated with that node are evaluated. This iterative process may continue until all relationship have been evaluated or, as an alternative, until defined groupings of highly related object nodes that may share certain properties now remain (blocks 420 and 430). For instance, for a nodal graph featuring hundreds of thousands of relationship, a prescribed percentage or number of relationship may be evaluated for processing optimization.

Once the filtering scheme completes, a clustering scheme is performed that evaluates the relationships between portions of analytic information (block 440). Stated differently, using the nodal graph for illustrative purposes, the clustering scheme removes one or more relationships among the nodes to form clusters. As shown in FIG. 6B, one clustering scheme may perform an analysis of the "relatedness" of the relationships between the nodes. According to one embodiment of the invention, the nodes may be analyzed based on the number of relationships associated with each node, where nodes with a high number of relationships are maintained while nodes associated with a lesser number of relationships, such as edge nodes, are removed from the nodal graph. Herein, as shown, the incidental relationships 630 and 640 are removed to isolate clusters 600, 610 and 620.

Referring again back to FIG. 4, after the node clusters have been produced, the features associated with a selected cluster (or each of the clusters) may be analyzed (block 450). As an illustrative example presented in FIG. 6C, analysis may be conducted through one or more targeted searches based on the properties associated with the nodes and relationships within the analyzed cluster. As a result, the cluster analysis logic 280 of FIG. 2 amasses a plurality of features 650 associated with the cluster. Examples of these features may include, but are not limited or restricted to (1) the total number of object nodes, (2) the number nodes associated with a particular data type, (3) the type of industry associated with the cluster, (4) the number of nodes with creation time within a certain time zone, and/or (5) node connectivity measurements, or the like.

Figure 7:
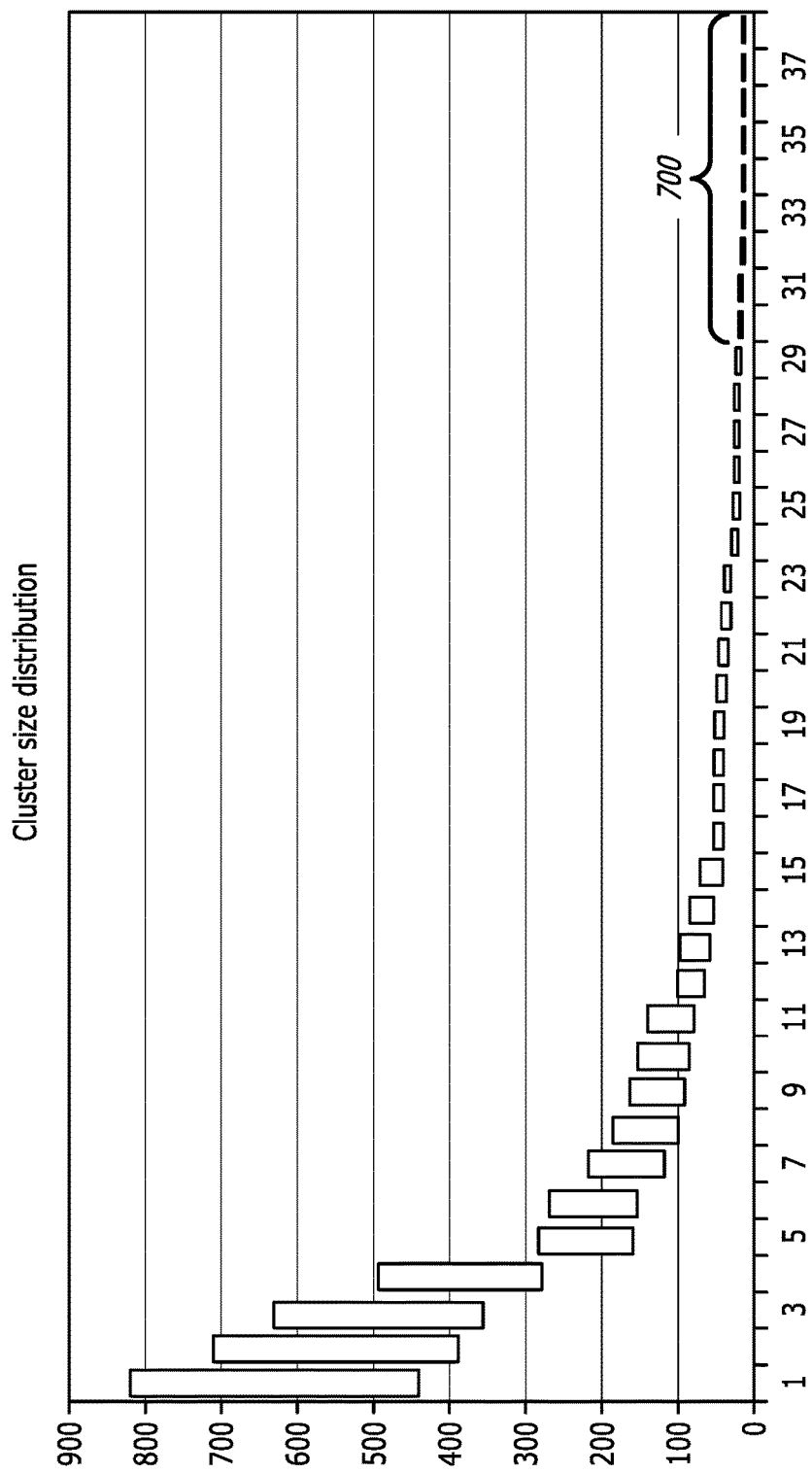
FIG. 7 illustrates an exemplary embodiment of a premium attack detection phase that analyzes cluster sizes in determining whether a selected cluster is associated with a premium attack.

Therefore, the cluster features 650 may be used to update the remaining analytic information (i.e. update the nodal graph or generate a new nodal graph) to provide a more comprehensive viewpoint of clustered activity (block 460) with additional nodes and relationships 670 as illustrated in FIG. 6D. Based at least in part on the cluster features, the classification logic of the attack classification system may classify whether a particular cluster is associated with a premium attack (as described above), and if so, generates and transmits an alert signifying detection of a premium attack (blocks 470, 480 & 490). According to one embodiment of the disclosure, this determination may involve an analysis of the cluster features, where the cluster features may have different weightings to separate those cluster features that have a higher correlation to a premium attack (e.g., a total number of nodes less than a predetermined number) as shown in FIG. 7 than other cluster features (e.g., clusters having less than 30 nodes as represented by attacks represented by clusters 700).

Figure 8:
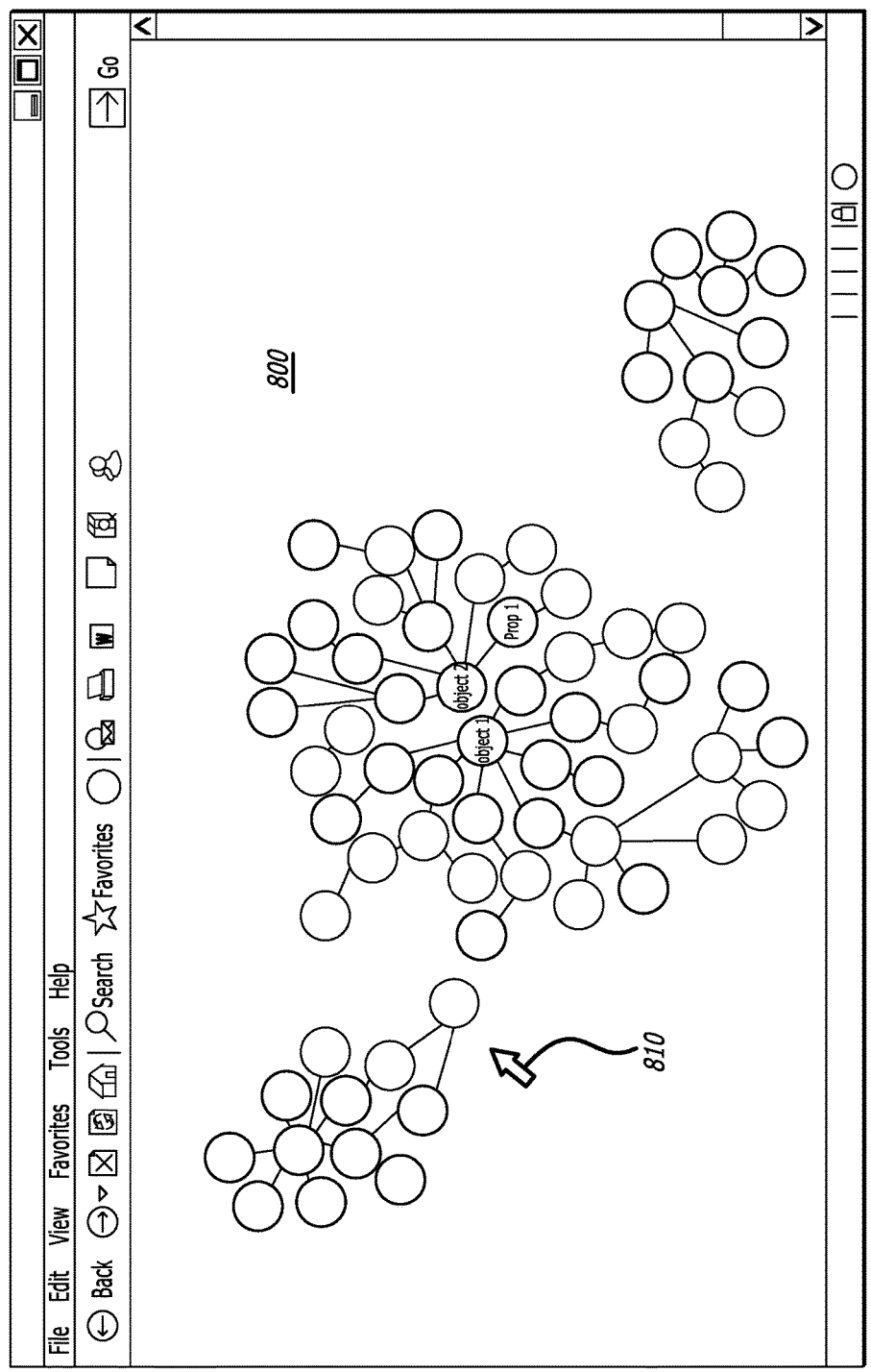
FIG. 8 illustrates a graphic user interface that may be rendered in response to completion of the cluster formation and analysis phase that provides a viewer with access to information pertaining to a cluster suspected as being associated with a premium attack.

Referring to FIG. 8, a graphic user interface 800 that may be rendered in response to completion of the cluster formation and cluster analysis phases (see FIG. 6D). The graphic user interface 800 provides a viewer with access to information associated with a cluster suspected as being associated with a premium attack as shown. In particular, using a mouse pointer 810, a viewer can select any node or relationship within clusters 600, 610 and 620 to analyze the properties (attributes) associated with each node for subsequent detailed analysis of clusters associated with premium attacks.

Hence, the graphic user interface 800 operates as an interactive tool that allows analysts to visualize the attack scenario and analyze the properties of a premium attack to better counter a similar future attack. Herein, the attack classification system may generate displayable nodal graphs that may highlight types of objects, highlight affected end point devices, highlight links to external attacker's infrastructure, and show time progression (i.e. lifecycle of the attack—where multiple nodal graphs may be arranged in time sequence.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A computerized method for detecting premium attacks by an attack classification system including one or more hardware processors and storage medium, the method comprising:
   receiving, by the attack classification system, analytic information;
   generating, by the attack classification system, logical representations for different portions of the analytic information represented as a nodal graph, the logical representations include objects, properties, and relationships between the objects and the properties;
   filtering, by the attack classification system, a first set of one or more relationships from the relationships, each of the first set of relationships provides lesser assistance in clustering the objects and the properties than a remaining plurality of relationships from the relationships;
   performing, by the attack classification system, a clustering operation that forms one or more clusters by removing a second set of one or more relationships from the remaining plurality of relationships, the one or more clusters includes a first cluster being a logical representation of a first plurality of objects of the objects, a first plurality of properties of the properties and a plurality of relationships being the remaining plurality of relationships excluding the second set of relationships;
   analyzing, by the attack classification system, at least the first cluster of the one or more clusters to determine features of at least the first cluster;
   introducing the determined features associated with the first cluster into the nodal graph; and
   analyzing the features of the first cluster to determine whether the first plurality of objects, the first plurality of properties and the plurality of relationships forming the first cluster are associated with a premium attack, the analyzing of the features of the first cluster comprises applying rule-based constraints to the features of at least the first cluster to determine that the features correspond to cluster features that are commonly present in premium attacks.

2. The computerized method of claim 1, wherein the analytic information includes information gathered during an analysis of at least one detected malicious attack and contextual information associated with the at least one detected malicious attack.

3. The computerized method of claim 1, wherein the receiving of the analytic information is responsive to a triggering event that includes the attack classification system determining that a prescribed period of time has elapsed from a prior analysis for a presence of a premium attack.

4. The computerized method of claim 1, wherein the generating of the logical representations for different portions of the analytic information comprises
   structuring a first portion of the analytic information as one of the objects that is logically represented as a first node in accordance with a graph data model;
   structuring a second portion of the analytic information as one of the properties that is logically represented as a second node in accordance with a graph data model; and
   determining a logical relationship between nodes associated with the objects and properties, including a first relationship between the first node and the second node.

5. The computerized method of claim 1, wherein the filtering of the first set of relationships from the relationships comprises (i) determining, by iterative analysis of each of the relationships, whether one or more relationships provide lesser assistance in the clustering of the objects and the properties than the remaining plurality of relationships, and (ii) removing the one or more relationships that are operating as the first set of relationships while retaining the remaining plurality of relationships.

6. The computerized method of claim 5, wherein the determining whether the one or more relationships provide lesser assistance in the clustering of the objects and the properties includes determining whether any of the relationships is based on a call to a particular search engine.

7. The computerized method of claim 5, wherein the determining whether the one or more relationships provide lesser assistance in the clustering of the objects and the properties includes determining whether any of the relationships occur outside a desired time period.

8. The computerized method of claim 5, wherein the determining whether the one or more relationships provide lesser assistance in the clustering of the objects and the properties includes determining whether any of the relationships pertains to a known benign domain or Internet Protocol (IP) address.

9. The computerized method of claim 1, wherein the clustering operation removes the second set of relationships by maintaining relationships associated with the one or more objects associated with at least a prescribed number of relationships and the plurality of properties associated with at least the prescribed number of relationships.

10. The computerized method of claim 1, wherein the analyzing of at least the first cluster comprises conducting an analysis of attributes associated with the object, properties and relationships associated with the first cluster to determine the features of the first cluster.

11. The computerized method of claim 10, wherein the features of the first cluster include one or more of (1) a number of objects logically represented within the first cluster; (2) a number of objects that are associated with a particular type of executable; (3) a number of objects that are associated with a particular type of non-executable; (4) a number of objects and properties associated with a particular industry; (5) node connectivity information.

12. The computerized method of claim 1, wherein the rule-based constraints include a first constraint associated with a size of the cluster as represented by a range in an aggregate number of the first plurality of objects and the first plurality of properties.

13. The computerized method of claim 12, wherein the rule-based constraints further include a second constraint associated with lateral proliferation of malware, the second constraint is represented by a range in a number of new client devices detected with malware per a selected time frame.

14. The computerized method of claim 12, wherein the rule-based constraints includes a second constraint associated with a range in number of original sources of the analytic information that infers a concentrated attack.

15. The computerized method of claim 1, wherein the premium attack is a cyberattack directed toward a specific target or a specific set of targets.

16. The computerized method of claim 1, wherein the premium attack is a cyberattack that exhibits signs of manual operator activity during the cyberattack.

17. An attack classification system for detecting premium attacks, comprising:

one or more hardware processors; and a storage medium that stores one or more software modules, including:

data collection logic that, when executed by the one or more hardware processors, obtains analytic information from one or more resources remotely located from the attack classification system, mapping logic that, when executed by the one or more hardware processors and in accordance with a selected data model, generates logical representations, operating as objects, properties and relationships, for different portions of the analytic information represented as a nodal graph, filtering logic that, when executed by the one or more hardware processors, filters a first set of one or more relationships from the relationships and each of the first set of relationships providing lesser assistance in clustering the objects and the properties than a remaining plurality of relationships from the relationships, cluster formation logic that, when executed by the one or more hardware processors, performs a clustering operation by forming one or more clusters by removing a second set of one or more relationships from the remaining plurality of relationships, the one or more clusters includes a first cluster being a logical representation of a first plurality of objects of the objects, a first plurality of properties of the properties and a plurality of relationships being the remaining plurality of relationships excluding the second set of relationships, cluster analysis logic to analyze at least the first cluster of the one or more clusters to determine features of at least the first cluster and to introduce the determined features associated with the first cluster into the nodal graph, and classification logic to analyze the features of the first cluster to determine whether the first plurality of objects, the first plurality of properties and the plurality of relationships forming the first cluster are associated with a premium attack, the analyzing of the features of the first cluster comprises applying rule-based constraints to the features of at least the first cluster to determine that the features correspond to cluster features that are commonly present in premium attacks.

18. The attack classification system of claim 17, wherein the analytic information includes information gathered during an analysis of at least one detected malicious attack and contextual information associated with the at least one detected malicious attack.

19. The attack classification system of claim 17, wherein the data collection logic obtains the analytic information in response to a triggering event that includes a determination that a prescribed period of time has elapsed from a prior analysis for a presence of a premium attack.

20. The attack classification system of claim 17, wherein the mapping logic generates the logical representations for the different portions of the analytic information by at least structuring a first portion of the analytic information as one of the objects that is logically represented as a first node in accordance with a graph data model;

structuring a second portion of the analytic information as one of the properties that is logically represented as a second node in accordance with a graph data model; and determining a logical relationship between nodes associated with the objects and properties, including a first relationship between the first node and the second node.

21. The attack classification system of claim 17, wherein the filtering logic filters the first set of relationships from the relationships by at least (i) determining, by iterative analysis of each of the relationships, whether one or more relationships provide lesser assistance in the clustering of the objects and the properties than the remaining plurality of relationships, and (ii) removing the one or more relationships that are operating as the first set of relationships while retaining the remaining plurality of relationships.

22. The attack classification system of claim 21, wherein the filtering logic determining whether the one or more relationships provide lesser assistance in the clustering of the objects and the properties includes determining whether any of the relationships is based on a call to a particular search engine.

23. The attack classification system of claim 21, wherein the filtering logic determining whether the one or more relationships provide lesser assistance in the clustering of the objects and the properties includes determining whether any of the relationships occur outside a desired time period.

24. The attack classification system of claim 21, wherein the filtering logic determining whether the one or more relationships provide lesser assistance in the clustering of the objects and the properties includes determining whether any of the relationships pertains to a known benign domain or Internet Protocol (IP) address.

25. The attack classification system of claim 17, wherein the cluster formation logic removes the second set of relationships by maintaining relationships associated with the one or more objects associated with at least a prescribed number of relationships and the plurality of properties associated with at least the prescribed number of relationships.

26. The attack classification system of claim 17, wherein the cluster analysis logic to analyze the first cluster by at least conducting an analysis of attributes associated with the object, properties and relationships associated with the first cluster to determine the features of the first cluster.

27. The attack classification system of claim 26, wherein the features of the first cluster include one or more of (1) a number of objects logically represented within the first cluster; (2) a number of objects that are associated with a particular type of executable; (3) a number of objects that are associated with a particular type of non-executable; (4) a number of objects and properties associated with a particular industry; (5) node connectivity information.

28. The attack classification system of claim 17, wherein the rule-based constraints include a first constraint associated with a size of the cluster as represented by a range in an aggregate number of the first plurality of objects and the first plurality of properties.

29. The attack classification system of claim 28, wherein the rule-based constraints further include a second constraint associated with lateral proliferation of malware, the second constraint is represented by a range in a number of new client devices detected with malware per a selected time frame.

30. The attack classification system of claim 28, wherein the rule-based constraints includes a second constraint associated with a range in number of original sources of the analytic information that infers a concentrated attack.

31. The attack classification system of claim 17, wherein the premium attack is a cyberattack directed toward a specific target or a specific set of targets.

32. The attack classification system of claim 17, wherein the premium attack is a cyberattack that exhibits signs of manual operator activity during the cyberattack.

33. An attack classification system for detecting premium attacks, comprising:
one or more hardware processors; and
a storage medium that stores one or more software modules, including:
data collection logic that, when executed by the one or more hardware processors, obtains analytic information from one or more resources remotely located from the attack classification system,
mapping logic that, when executed by the one or more hardware processors and in accordance with a selected data model, generates logical representations, operating as objects, properties and relationships, for different portions of the analytic information represented as a nodal graph,
filtering logic that, when executed by the one or more hardware processors, filters a first set of one or more relationships from the relationships and each of the first plurality of relationships providing lesser assistance in clustering the objects and the properties than a remaining plurality of relationships from the relationships,
cluster formation logic that, when executed by the one or more hardware processors, performs a clustering operation by forming one or more clusters from removing one or more relationships of a plurality of relationships associated with logical representations of different portions of the analytic information, the logical representations of different portions of the analytic information are represented in accordance with a data model scheme as at least a plurality of objects,
cluster analysis logic to analyze at least a first cluster of the one or more clusters to determine features of at least the first cluster and to introduce the determined features associated with the first cluster into the nodal graph, and
classification logic to analyze the features of the first cluster to determine whether the plurality of objects and a remaining relationships of the plurality of relationships forming the first cluster are associated with a premium attack, the analyzing of the features of the first cluster comprises applying rule-based constraints to the features of at least the first cluster to determine that the features correspond to cluster features that are commonly present in premium attacks.

34. The attack classification system of claim 33, wherein the analytic information includes information gathered during an analysis of at least one detected malicious attack and contextual information associated with the at least one detected malicious attack.

35. The attack classification system of claim 33, wherein the mapping logic generates the logical representations for the different portions of the analytic information by at least
structuring a first portion of the analytic information as one of the objects that is logically represented as a first node in accordance with a graph data model;
structuring a second portion of the analytic information as one of the properties that is logically represented as a second node in accordance with a graph data model; and
determining a logical relationship between nodes associated with the objects and properties, including a first relationship between the first node and the second node.

36. The attack classification system of claim 33, wherein the filtering logic filters the first set of relationships from the relationships by at least (i) determining, by iterative analysis of each of the relationships, whether one or more relationships provide lesser assistance in the clustering of the objects and the properties than the remaining plurality of relationships, and (ii) removing the one or more relationships that are operating as the first set of relationships while retaining the remaining plurality of relationships.

37. The attack classification system of claim 36, wherein the filtering logic determining whether the one or more relationships provide lesser assistance in the clustering of the objects and the properties by at least determining whether any of the relationships is based on a call to a particular search engine.

38. The attack classification system of claim 36, wherein the filtering logic determining whether the one or more relationships provide lesser assistance in the clustering of the objects and the properties by at least determining whether any of the relationships occur outside a desired time period.

39. The attack classification system of claim 36, wherein the filtering logic determining whether the one or more relationships provide lesser assistance in the clustering of the objects and the properties by at least determining whether any of the relationships pertains to a known benign domain or Internet Protocol (IP) address.

40. The attack classification system of claim 33, wherein the cluster formation logic removes the second plurality of relationships by maintaining relationships associated with the one or more objects associated with at least a prescribed number of relationships and the plurality of properties associated with at least the prescribed number of relationships.

41. The attack classification system of claim 33, wherein the cluster analysis logic to analyze the first cluster by at least conducting an analysis of attributes associated with the object, properties and relationships associated with the first cluster to determine the features of the first cluster.

42. The attack classification system of claim 33, wherein the features of the first cluster include one or more of (1) a number of objects logically represented within the first cluster; (2) a number of objects that are associated with a particular type of executable; (3) a number of objects that are associated with a particular type of non-executable; (4) a number of objects and properties associated with a particular industry; or (5) node connectivity information.

43. The attack classification system of claim 33, wherein the rule-based constraints include a first rule-based constraint associated with a size of the cluster as represented by a range in an aggregate number of the first plurality of objects and the first plurality of properties.

44. The attack classification system of claim 43, wherein the rule-based constraints further include a second rule-based constraint associated with lateral proliferation of malware, the second rule-based constraint is represented by a range in a number of new client devices detected with malware per a selected time frame.

45. The attack classification system of claim 44, wherein the rule-based constraints further include a second rule-based constraint associated with a range in number of original sources of the analytic information that infers a concentrated attack.

46. The attack classification system of claim 33, wherein the premium attack is a cyberattack directed toward a specific target or a specific set of targets.

47. The attack classification system of claim 33, wherein the premium attack is a cyberattack that exhibits signs of manual operator activity during the cyberattack.

\* \* \* \* \*